United States Patent [19]
Lussier

[11] 3,993,323
[45] Nov. 23, 1976

[54] DRAG CHUTE FOR BICYCLE

[75] Inventor: Stephen E. Lussier, Plymouth, Mass.

[73] Assignee: Lawrence Peska Associates, Inc., New York, N.Y. ; a part interest

[22] Filed: June 2, 1975

[21] Appl. No.: 582,991

[52] U.S. Cl. .............................. 280/289 R; 46/86 A
[51] Int. Cl.² .......................................... B62J 39/00
[58] Field of Search ...................... 280/289, 289 R; 46/86 R, 86 A, 86 B, 86 C, 243 LV; 244/148, 142, 113

[56] References Cited
UNITED STATES PATENTS

| | | |
|---|---|---|
| 1,311,083 | 7/1919 | Moon .................................. 244/148 |
| 2,124,222 | 7/1938 | Wiley .................................. 240/58 |
| 3,228,634 | 1/1966 | Chakoian ........................... 244/113 |
| 3,380,756 | 4/1968 | Poynter .............................. 280/289 |
| 3,545,790 | 12/1970 | Davis .................................. 280/289 |
| 3,614,132 | 10/1971 | Ashworth ........................... 280/289 |

FOREIGN PATENTS OR APPLICATIONS 1,034,535    4/1953    France ............................... 46/86 A Primary Examiner—Kenneth H. Betts
Attorney, Agent, or Firm—Eugene V. Mandel

[57]        ABSTRACT

A spring ejected drag chute for a bicycle housed in a container clamped to the rear fender.

7 Claims, 2 Drawing Figures

DRAG CHUTE FOR BICYCLE

BACKGROUND OF THE INVENTION

This invention relates to a drag chute for vehicles and in particular to one mounted on a bicycle and more particularly to one positively ejected.

Drag chutes have been used on aircraft, automobiles and other vehicles as a braking and decelerating device.

The deploying chute is attention getting and can be colorful. Under some circumstances, the appearance of the chute is of paramount importance. To rapidly achieve the deployed condition, positive ejection and deployment means are desirable. A controllable release for the positive ejection means would permit the vehicle operator to initiate deployment.

Colorful, decorated chutes increase the enjoyment of participants and spectators. A pre-packaged, simple, easy to mount, positive and safe device for operation by children would contribute to greater enjoyment and therefore greater participation in simulated athletic events with attendant physical fitness and psychological benefits.

A control adding minimum complexity to vehicle operation is desired for safety.

The purpose of this invention is to provide an easily controlled positive ejection system for drag chutes for vehicles.

The essence of this invention is a spring actuated positive ejection system for drag chutes.

Further objects and advantages of this invention will appear more clearly from the following description of a non-limiting illustrative embodiment and the accompanying drawings in which like numerals designate like parts thruout the several views.

DESCRIPTION OF TYPICAL EMBODIMENT

Figure 1:
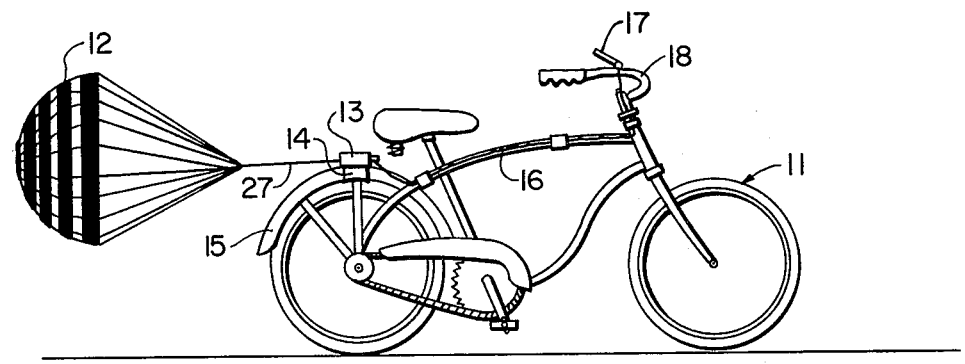
FIG. 1 shows a bicycle with the parachute deployed.
Figure 2:
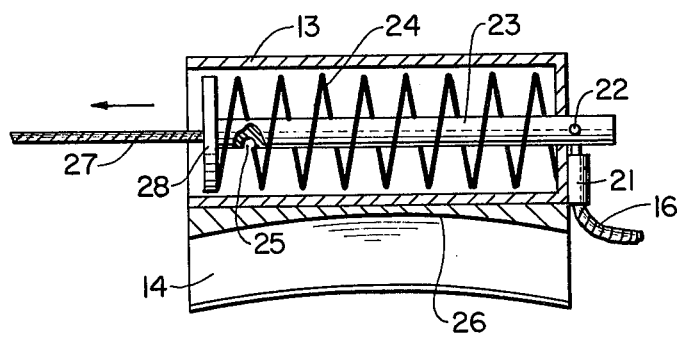
FIG. 2 shows a sectional view of the container.

In the drawings, a drag chute attached to a bicycle embodying features of the invention is illustrated. The vehicle shown in FIG. 1 is a common bicycle 11 provided with a hand operated lever 17 mounted on the handlebar 18 and cable 16 connected to a release mechanism for chute 12 which is stored in folded condition in container 13. Container 13 may be clamp mounted to the bicycle rear fender 15. The container 13 may be suitably shaped as in a curve 26 to conform to fender 15 and has clamp portions 14 secured thereto. The hand lever 17 and cable 16 may be the known types commonly used for brake control or the like.

Prior to use, the chute is collapsed and folded and plate 28 is manually depressed against spring 24 pressure until release pin 21 can pop into cavity 25 in plunger 23 which is mounted and guided in container 13.

Parachute 12 is tethered to and retained by cable 27 attached to plunger 23. Upon manual depression of lever 17 on handlebar 18 cable 16 is pulled in tension and pulls release pin 21, mounted in and guided by container 13, out of cavity 25 in plunger 24 permitting compressed spring 24 to extend until stop pin 22 strikes a fixed part attached to container 13. The parachute 12 is thereby released and ejected and deployed behind the vehicle.

Depending upon shape and design, the deploying parachute has variable stability characteristics.

Experiments indicate that a ring slot type drag chute may be adequately stable and effective.

The simple device here described may be mounted on any suitable vehicle. The control mechanism can be varied to suit the particular arrangement. Other known stored energy devices may be used for the power to release and deploy the chute.

The chute may be decorated and constructed in any known way. The container may be made by known methods of known materials such as metals or plastics.

The invention includes all novelty residing in the description and drawings. It is obvious to those skilled in the art that various minor changes can be made without departing from the concept of this invention and all such as fall within the reasonable scope of the appended claims are claimed.

What is claimed is:

1. A bicycle attachment comprising a parachute, in combination with container means for holding said chute in a collapsed position, the container configured to conform to the shape of a part of the bicycle such as a rear fender, a clamp for holding the container to the rear fender, tether means for attaching said chute to said container, positive ejection means for ejecting the chute from the container, control means for the ejection means, release means for the control means, whereby the parachute is released from the container and deployed.

2. A system according to claim 1 in which the ejection means is powered by stored energy means.

3. A system according to claim 2 in which the stored energy means is provided by spring means.

4. A system according to claim 1 in which the release means is by cable.

5. A system according to claim 1 in which the parachute is a ring slot type drag chute.

6. A system according to claim 1 in which the container is made of metal.

7. A system according to claim 1 in which the container is made of plastic.

* * * * *